US009336172B2

(12) United States Patent
Ando et al.

(10) Patent No.: US 9,336,172 B2
(45) Date of Patent: May 10, 2016

(54) PARALLEL COMPUTER SYSTEM, DATA TRANSFER DEVICE, AND METHOD FOR CONTROLLING PARALLEL COMPUTER SYSTEM FOR PERFORMING ARBITRATION

(71) Applicant: FUJITSU LIMITED, Kawasaki-shi, Kanagawa (JP)

(72) Inventors: Shun Ando, Yokohama (JP); Shinya Hiramoto, Yokohama (JP); Tomohiro Inoue, Kawasaki (JP); Yuta Toyoda, Kawasaki (JP); Masahiro Maeda, Zama (JP); Yuichiro Ajima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 403 days.

(21) Appl. No.: 13/920,750

(22) Filed: Jun. 18, 2013

(65) Prior Publication Data

US 2014/0052885 A1 Feb. 20, 2014

(30) Foreign Application Priority Data

Aug. 16, 2012 (JP) ................................ 2012-180616

(51) Int. Cl.
*G06F 13/36* (2006.01)
*G06F 13/40* (2006.01)

(52) U.S. Cl.
CPC ........ *G06F 13/4022* (2013.01); *G06F 13/4027* (2013.01)

(58) Field of Classification Search
USPC .................... 710/104–115, 31–38, 305–317; 709/201–203, 230–234
See application file for complete search history.

(56) References Cited

U.S. PATENT DOCUMENTS 5,666,551 A * 9/1997 Fenwick ............. G06F 13/4217 709/207
6,032,205 A * 2/2000 Ogimoto ........... G06F 15/17375 370/230
6,055,599 A * 4/2000 Han .................. G06F 15/17393 709/200
6,484,220 B1 * 11/2002 Alvarez, II .......... G06F 13/4022 710/20
6,751,698 B1 * 6/2004 Deneroff ........... G06F 15/17343 710/317
7,406,075 B2 * 7/2008 Naoi ..................... H04L 49/101 370/360
8,688,886 B1 * 4/2014 Rohana ............... G06F 13/4031 710/306

FOREIGN PATENT DOCUMENTS

JP 11-73403 3/1999
JP 2001-22711 1/2001

* cited by examiner

*Primary Examiner* — Raymond Phan
(74) *Attorney, Agent, or Firm* — Fujitsu Patent Center

(57) ABSTRACT

A switch includes a plurality of ports and a combination determining unit that determines a central processing unit (CPU) to be paired with one of the ports. The port includes: an arbitration circuit that selects the CPU to be paired therewith when receiving an arbitration request from the CPU to be paired in a predetermined state, and selects one of the CPUs from which the arbitration request has been received in other cases to return transmission permission; and a data transfer unit that transfers the received data from the selected CPU to another CPU. The CPU includes: a request transmission unit that transmits the arbitration request to the ports; and a data transmission unit that transmits data to the paired port when the arbitration request is transmitted to the paired port in the predetermined state, and transmits data to the ports that have returned transmission permission in other cases.

9 Claims, 9 Drawing Sheets

FIG.3

| SOURCE | OUTPUT PORT | ACCESS COUNT |
|---|---|---|
| CPU 1 | OUTPUT PORT 62 | 30 |
| CPU 1 | OUTPUT PORT 63 | 20 |
| CPU 2 | OUTPUT PORT 64 | 25 |
| CPU 3 | OUTPUT PORT 62 | 10 |
| CPU 4 | OUTPUT PORT 61 | 15 |
| CPU 4 | OUTPUT PORT 63 | 50 |

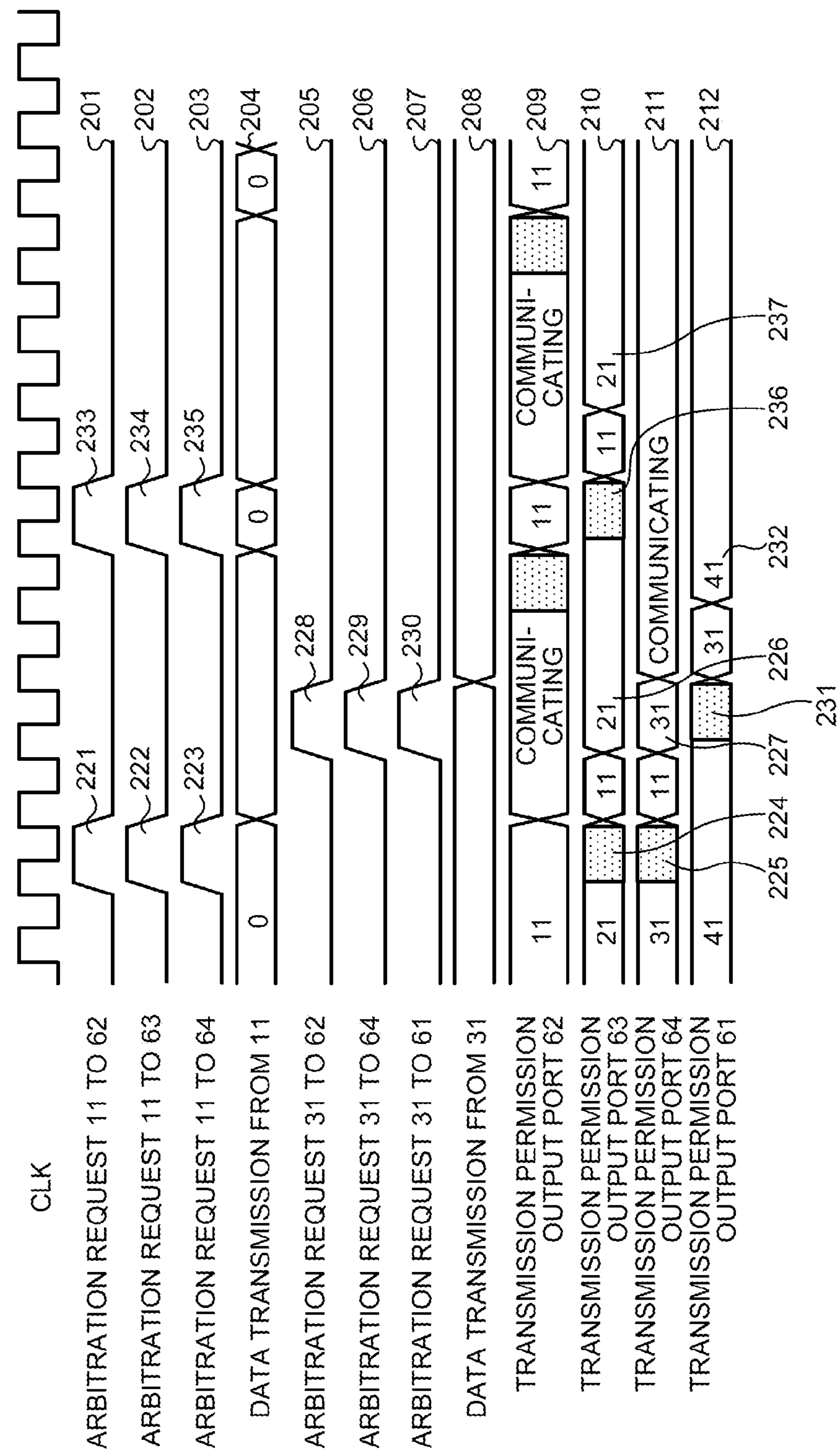
FIG.5
CLK
ARBITRATION REQUEST 11 TO 62
ARBITRATION REQUEST 11 TO 63
ARBITRATION REQUEST 11 TO 64
DATA TRANSMISSION FROM 11
ARBITRATION REQUEST 31 TO 62
ARBITRATION REQUEST 31 TO 64
ARBITRATION REQUEST 31 TO 61
DATA TRANSMISSION FROM 31
TRANSMISSION PERMISSION OUTPUT PORT 62
TRANSMISSION PERMISSION OUTPUT PORT 63
TRANSMISSION PERMISSION OUTPUT PORT 64
TRANSMISSION PERMISSION OUTPUT PORT 61
COMMUNI-CATING
COMMUNICATING
201
202
203
204
205
206
207
208
209
210
211
212
221
222
223
224
225
226
227
228
229
230
231
232
233
234
235
236
237

PARALLEL COMPUTER SYSTEM, DATA TRANSFER DEVICE, AND METHOD FOR CONTROLLING PARALLEL COMPUTER SYSTEM FOR PERFORMING ARBITRATION

CROSS-REFERENCE TO RELATED APPLICATION

This application is based upon and claims the benefit of priority of the prior Japanese Patent Application No. 2012-180616, filed on Aug. 16, 2012, the entire contents of which are incorporated herein by reference.

FIELD

The embodiments discussed herein are directed to a parallel computer system, a data transfer device, and a method for controlling the parallel computer system.

BACKGROUND

In a parallel computer and the like, a plurality of computation nodes, that is, electronic computers having a central processing unit (CPU) and a memory and the like are connected to improve performance of an entire system. A network used in an information processing system having such computation nodes may be configured by connecting the computation nodes via switches. As such a switch, a crossbar switch serving as a data transfer device may be used.

The crossbar switch includes one having a buffer in an input port and one having no buffer in the input port due to restriction on amount of materials. In a case where the crossbar switch having no buffer is used, a handshake such as synchronizing data between the input port of the crossbar switch and a source such as a computation node supplying data to the input port is performed. In a case where there are requests to send data from a plurality of computation nodes, a target of the handshake is determined. This process for determining the target of the handshake may be called arbitration in some cases. An example of a handshake system includes a system that transmits an arbitration request from a source to the crossbar switch, the crossbar switch having received the request sends transmission permission to the source, and the source transmits a data packet to the crossbar switch. There is also a system in which a plurality of computation nodes sequentially permit data transmission for an input port for a predetermined period.

In a case where the arbitration request is used, the crossbar switch receives arbitration requests for data from a plurality of computation nodes and performs arbitration processing for determining a computation node of which arbitration request is received. The selected computation node obtains transmission permission with respect to a port that has selected the computation node, and transmits a data packet to a port that has received the transmission permission. As a method for processing the arbitration request in such arbitration processing, a method for once deleting an arbitration request that has not been selected in one port and an arbitration request output from one port to the other port by the selected computation node may be considered. Hereinafter, the arbitration request that has not been selected in one port and the arbitration request output from one port to the other port by the selected computation node are referred to as an "unused arbitration request". Deleting the unused arbitration request may be referred to as "negating" in some cases. In addition, a method for continuing to send the arbitration request output from one port to the other port by the selected computation node may be exemplified as the other processing method.

In a related art, waiting time until arbitration is created for each port, an arbitration is performed by an arbitration device after the waiting time has elapsed, and a dead cycle of the crossbar switch is suppressed (for example, refer to Japanese Laid-open Patent Publication No. 11-73403). In another related art, a counter is periodically decremented by setting a length of data to the counter after sending a data transfer permission signal, and the next arbitration processing is performed when the counter becomes zero (for example, refer to Japanese Laid-open Patent Publication No. 2001-22711).

In such a system, communication probability may be different depending on a combination of a computation node and a port. In this case, data transmission is performed by connecting the computation node and the port at the same degree in the conventional system. Therefore, it has been difficult to improve efficiency of data transfer processing since an input port having high communication probability and an input port having low communication probability are on a par with each other.

In order to perform processing at high speed corresponding to relative merits of an output port having high communication probability and an output port having low communication probability, it may be considered that a combination of a computation node and an input port having high communication probability is preferentially connected as a group. In this case, a method in which an unused arbitration request is once deleted and each computation node sends a new arbitration request may be used. In this case, there may be a problem as follows.

For example, an example of data transfer in a parallel computer using a combination of which communication probability is high as a group will be described with reference to FIG. 9. FIG. 9 is a diagram for explaining data transfer in a parallel computer in a case where a combination of which communication probability is high is grouped.

A computation node 901 and an output port 912 are grouped, a computation node 902 and an output port 913 are grouped, a computation node 903 and an output port 914 are grouped, and a computation node 904 and an output port 911 are grouped. The computation node 901 transmits arbitration requests 921 to 923 to respective output ports 912 and 914, receives transmission permission 924 from the output port 912, and selects data transfer to the computation node 902 via the output port 912. Thereafter, the computation node 901 deletes arbitration requests to the output ports 913 and 914. In addition, the computation node 901 transmits a new arbitration request to the port 912. In this case, the computation node 901 transmits an arbitration request to the output ports 912 to 914 at the same time after the data transmission to the port 912 is completed. In this case, the output ports 913 and 914 confirm that data transmission corresponding to transmission permission transmitted to the computation nodes 902 and 903 grouped with the output ports 913 and 914 is not performed, and performs arbitration with respect to the arbitration request of the computation node 901. In contrast, the output port 912 may perform arbitration with respect to the arbitration request from the computation node 901 immediately after receiving the request. Therefore, the latency of the output port 912 is smaller than that of the output ports 913 and 914, and the transmission permission may be immediately transmitted to the computation node 901. Therefore, probability that the output port 912 is selected as a data transmission destination in the computation node 901 is higher than that of the ports 913 and 914. As a result, a possibility of data transfer being repeatedly performed using the same combination is increased.

Here, considering a case where the computation node 901 transmits arbitration requests to the output ports 912 to 914 at the same time after the data transmission to the output port 912 is completed, and the output ports 913 and 914 do not transmit transmission permission to computation nodes grouped therewith. In this case, the output port 912 is grouped with a computation node A901, so that latency of the output port 912 is smaller than that of the output ports 913 and 914 and the computation node 901 may immediately start data transmission with respect to the output port 901. Therefore, the output port 912 has a greater likelihood of being selected as a data transmission destination by the computation node 901 than that of the output ports 913 and 914. As a result, the possibility of data transfer being repeatedly performed using the same combination is also increased.

As described above, the data transfer becomes unbalanced in the conventional parallel computer, so that it becomes difficult to perform efficient communication.

In the related art in which the waiting time until the arbitration is created for each port, a case where a combination of which communication probability is high is grouped is not considered. Therefore, there is a high possibility that the grouped computation node and the port exclusively use a bus, and it is difficult to perform efficient communication. Also in the related art in which the arbitration is performed based on a counter to which a length of data is set, a case where a combination of which communication probability is high is grouped is not considered, so that it is also difficult to perform efficient communication.

SUMMARY

According to an aspect of an embodiment, a parallel computer system includes a plurality of computation nodes each of which performs computation; and a data transfer device connected to the computation nodes, wherein the data transfer device comprises: a plurality of ports that include: an arbitration unit that selects a computation node to be paired when receiving an arbitration request from the computation node to be paired in a predetermined state, receives the arbitration request from any one or more of the computation nodes in the other cases, selects one of the computation nodes from which the arbitration request has been received, and returns transmission permission to the selected computation node; and a data transfer unit that receives data from the computation node selected by the arbitration unit and transfers the received data to another computation node; and a combination determining unit that dynamically determines the computation node to be paired with each of the ports among the computation nodes, wherein each of the computation nodes comprises: a request transmission unit that transmits an arbitration request that is a request to send data, to the port; and a data transmission unit that transmits data to the paired port when the request transmission unit transmits an arbitration request to the paired port in the predetermined state, and transmits data to a port that has returned transmission permission to the arbitration request in the other cases.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a totaled result of an access count from each CPU to each output port;

FIG. 5 is a timing chart of data transmission process in a case where negation is performed by a conventional parallel computer;

DESCRIPTION OF EMBODIMENTS

Preferred embodiments of the present invention will be explained with reference to accompanying drawings. The parallel computer system, the data transfer device, and the method for controlling the parallel computer system disclosed in the present application are not limited to the embodiments described below.

[a] First Embodiment

Figure 1:
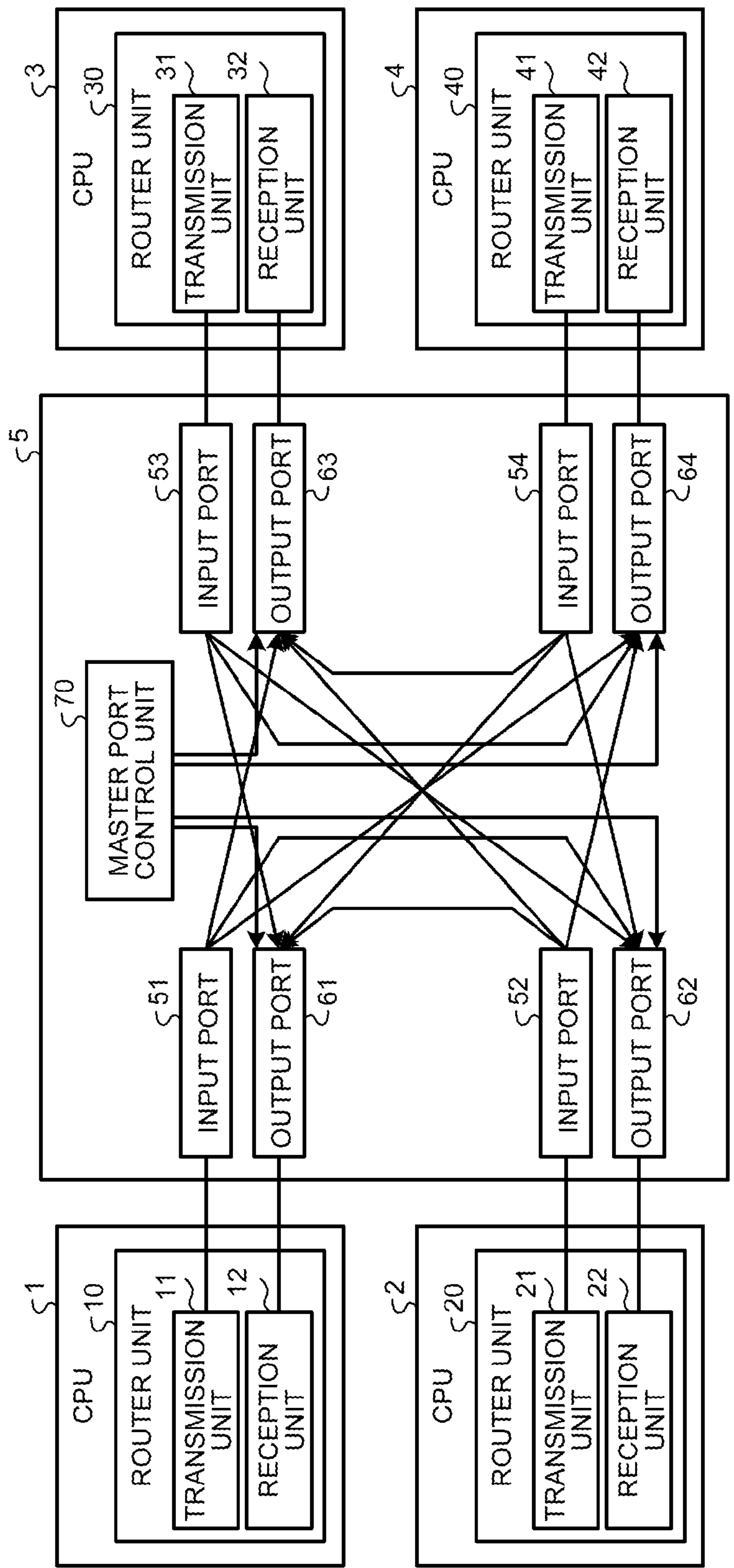
FIG. 1 is a configuration diagram of a parallel computer according to a first embodiment.

FIG. 1 is a configuration diagram of a parallel computer according to a first embodiment. As illustrated in FIG. 1, the parallel computer according to the present embodiment includes CPUs 1 to 4 and a crossbar switch 5 serving as a data transfer device connecting the CPUs. Although four CPUs are used in this embodiment, the number of CPUs provided in the parallel computer is not limited thereto, and may be less than four or more than four. In addition, although the crossbar switch 5 includes four input ports and four output ports corresponding to the number of CPUs in this embodiment, the number of ports is not limited thereto. The number of ports in the crossbar switch 5 may be different from the number of CPUs.

The CPU 1 includes a router unit 10 that controls communication between the CPU 1 and another CPU. The router unit 10 includes a transmission unit 11 and a reception unit 12. The transmission unit 11 performs an arbitration request that is a request for communication with respect to the crossbar switch 5 and transmits data to the other CPU. The reception unit 12 receives a notification of communication permission from the crossbar switch 5 and data transmitted from the other CPU.

The CPUs 2 to 4 have the same configuration as that of the CPU 1, that is, the CPUs 2 to 4 respectively include routers 21, 31, 41, transmission units 21, 31, 41, and reception units 22, 32, 42, so that description thereof is not repeated here.

The crossbar switch 5 includes input ports 51 to 54, output ports 61 to 64, and a master port control unit 70. The input port 51 and the output port 61 are paired ports. Similarly, the input ports 52 to 54 are paired with the output ports 62 to 64, respectively.

The input port 51 may be connected to any of the output ports 62 to 64 other than the output port 61 paired with the input port 51. The input port 51 is also connected to the transmission unit 11 of the CPU 1. The input port 51 receives data transmitted from the transmission unit 11 of the CPU 1 and input of the arbitration request. The input port 51 transfers data to an output port to which a CPU of communication destination that requires communication by the arbitration request is connected among the output ports 62 to 64. The input port 51 receives the notification of communication permission that is a response to the arbitration request from the output port, and outputs the notification to the transmission unit 11. In addition, the input port 51 transfers data received from the transmission unit 11 to an output port to which a CPU of destination of data transmitted from the transmission unit 11 is connected among the output ports 62 to 64.

The input ports 52 to 54 also have the same function as that of the input port 51 and behave in similar manner, so that the description thereof is not repeated here. The input ports 51 to 54 will be described in further detail later.

The master port control unit 70 determines CPUs that are paired with the output ports 61 and 62 and preferentially transfer data to the output ports 61 and 62. Hereinafter, the output port corresponding to the CPU in this group is referred to as "master port". The master port control unit 70 notifies the output port in the determined master port pair of information about a CPU that is paired with the master port. Details about determination of the master port by the master port control unit 70 will be described later.

The output port 61 may be connected to any of the input ports 52 to 54 other than the input port 51 paired with the output port 61. The output port 61 is also connected to the reception unit 12 of the CPU 1. The output port 61 receives the arbitration request from the CPUs 2 to 4 and performs arbitration for determining to give permission for which of the CPUs to transmit data. The output port 61 then outputs the notification of communication permission to the input port to which the CPU determined by the arbitration is connected. In addition, the output port 61 outputs the data transmitted from the CPUs 2 to 4 to the reception unit 12 of the CPU 1.

The output ports 62 to 64 also have the same function as that of the output port 61 and behave in similar manner, so that the description thereof is not repeated here. The output ports 61 to 64 will be described in further detail later.

A case where the output port 61 does not perform data transfer or a case where the output port 61 does not receive the arbitration request is referred to as an idle state. The output port 61 becomes a master port corresponding to the CPU designated by the master port control unit 70. The output port 61 is set to immediately perform data transfer from the CPU 1 without performing arbitration upon receiving the arbitration request from the CPU paired with the master port in the idle state. As described above, the output port 61 is set as a master port that preferentially transfers data to a CPU. When the crossbar switch 5 is activated, the output port 62 is set as a master port for the CPU 1. The output port 63 is set as a master port for the CPU 2. The output port 64 is set as a master port for the CPU 3. The output port 61 is set as a master port for the CPU 4.

In a case where any of the CPUs 1 to 4 transmits data to the other CPU among the CPUs 1 to 4, only one data transmission path may be secured since data size is large. That is, the CPUs 1 to 4 transmit data to any one of the CPUs in one data transmission process. In contrast, the CPUs 1 to 4 may secure a plurality of paths for the arbitration request and the like in one transmission process since data size of the arbitration request and the like is small. That is, the CPUs 1 to 4 may transmit the arbitration requests to a plurality of CPUs at the same time.

Figure 2:
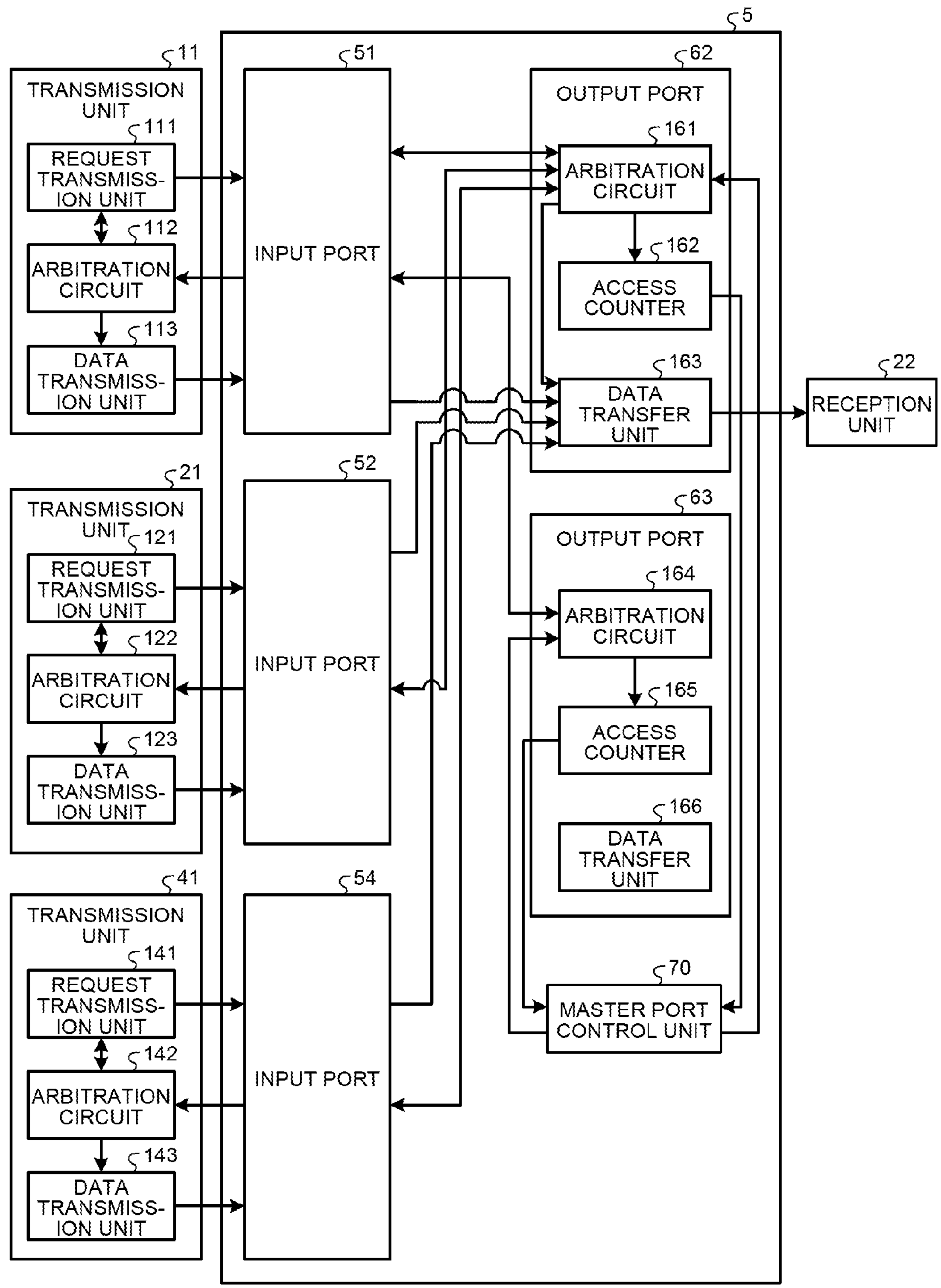
FIG. 2 is a block diagram illustrating a detail of the parallel computer according to the first embodiment.

The parallel computer according to the present embodiment will be described in further detail with reference to FIG. 2. FIG. 2 is a block diagram illustrating a detail of the parallel computer according to the first embodiment. Here, a case where the CPU 1 requests to send data for the CPUs 2 and 3, and the CPUs 2 and 4 request to send data for the CPU 3 is described as an example. In FIG. 2, the transmission unit, the input port, and the output port are illustrated for the sake of explanation, and other components are not illustrated.

The transmission unit 11 includes a request transmission unit 111, an arbitration circuit 112, and a data transmission unit 113. A transmission unit 21 includes a request transmission unit 121, an arbitration circuit 122, and a data transmission unit 123. A transmission unit 41 includes a request transmission unit 141, an arbitration circuit 142, and a data transmission unit 143. Although a transmission unit 31 is not illustrated in the drawings, the transmission unit 31 also has similar function.

In a case where the CPU 1 transmits data to any one of the CPUs 2 to 4, the request transmission unit 111 transmits the arbitration request to the input port 51. The arbitration request from the request transmission unit 111 may be transmitted to a plurality of CPUs at the same time. In addition, information about the CPU, which is a data transmission destination, is added to the arbitration request.

Here, the request transmission unit 111 outputs an arbitration request for the data transmission with respect to the CPU 2 to the input port 51. The request transmission unit 111 outputs an arbitration request for the data transmission with respect to the CPU 3 to the input port 51.

In addition, the request transmission unit 111 transmits information that the arbitration request is transmitted to the arbitration circuit 112 together with the information about the CPU of the data transmission destination designated by the arbitration request.

Subsequently, the request transmission unit 111 receives notification of selecting the CPU, which becomes a data transmission destination, from the arbitration circuit 112 and stops transmission of the arbitration request to each of the CPUs. For example, when receiving a notification that the CPU 2 is selected as the data transmission destination from the arbitration circuit 112, the request transmission unit 111 stops transmission of the arbitration request to the CPUs 2 and 3.

In a case where the output port 62 is in the idle state in which data transfer is not performed, the arbitration circuit 112 continues to receive, from the input port 51, the notification of communication permission from the output port 62, which is a master port. When receiving a notification that the arbitration request for the data transmission is transmitted from the request transmission unit 111 to the CPU 2 in this state, the arbitration circuit 112 instruct the data transmission unit 113 to transmit the data corresponding to the arbitration request transmitted by the request transmission unit 111.

In a case where the output port 62 is not in the idle state, the arbitration circuit 112 receives, from the input port 51, the notification of communication permission transmitted from the output port 62 as a response to the arbitration request from the request transmission unit 111. In addition, regardless of whether being in the idle state, the arbitration circuit 112 receives, from the input port 51, the notification of communication permission transmitted from the output ports 63 and 64 other than the master port as a response to the arbitration request. When receiving a plurality of notifications of communication permission, the arbitration circuit 112 selects the CPU connected to the output port that has transmitted the notification of communication permission that is first received as a data transmission destination, and instructs the data transmission unit 113 to transmit the data to the CPU.

For example, the arbitration circuit 112 receives the notification of communication permission transmitted from the output port 62 via the input port 51. Next, the arbitration circuit 112 receives the notification of communication permission transmitted from the output port 63 via the input port 51. The arbitration circuit 112 then instructs the data transmission unit 113 to transmit the data to the CPU 2 corresponding to the notification of communication permission that has been first received. In addition, the arbitration circuit 112 notifies the request transmission unit 111 of selecting the CPU 2 as a data transmission destination.

The arbitration circuit 122 of the transmission unit 21 and the arbitration circuit 142 of the transmission unit 41 behave in similar manner as the arbitration circuit 112. In this case, the arbitration circuit 122 of the transmission unit 21 and the arbitration circuit 142 of the transmission unit 41 do not obtain the notification of communication permission since the output port 63 selects the CPU 1 as a CPU to be permitted to transmit data by the arbitration.

The data transmission unit 113 receives an instruction to transmit data with respect to the CPU selected as a data transmission destination from the arbitration circuit 112. The data transmission unit 113 transmits the data to the designated CPU.

For example, the data transmission unit 113 receives an instruction to transmit data with respect to the CPU 2 from the arbitration circuit 112. The data transmission unit 113 transmits data addressed to the CPU 3 to the input port 51.

The input port 51 receives the arbitration request with respect to the CPU that is a data transmission destination from the request transmission unit 111. The input port 51 transmits the received arbitration request to the output port to which the CPU of the data transmission destination is connected.

For example, the input port 51 receives the arbitration request for the data transmission with respect to the CPU 3 from the request transmission unit 111. The input port 51 transmits the arbitration request to the output port 63 to which the CPU 3 is connected. The input port 51 then receives the arbitration request for the data transmission with respect to the CPU 2 from the request transmission unit 111. The input port 51 transmits the arbitration request to the output port 62 to which the CPU 2 is connected.

In a case where the output port 62 is in the idle state in which data transfer is not performed, the input port 51 continues to receive the notification of communication permission from an arbitration circuit 161 of the output port 62. The input port 51 then transmits the notification of communication permission from the arbitration circuit 161 to the arbitration circuit 112. Even in this case, if data transmission by the CPU 1 is permitted in the output port 63 other than the master port, the input port 51 receives the notification of communication permission from the output port 63 and transmits the received notification of communication permission to the arbitration circuit 112. However, the master port is given priority, so that the arbitration circuit 112 selects the CPU 2 connected to the output port 62 that is a master port for the CPU 1 as a data transmission destination as described later.

In contrast, in a case where the output port 62 is not in the idle state, the input port 51 behaves as follows. Regardless of whether the output port that has transmitted the arbitration request is the master port, if the data transmission is permitted in the output port that has transmitted the arbitration request, the input port 51 receives the notification of communication permission from the output port that has transmitted the arbitration request.

For example, the input port 51 receives the notification of communication permission from the arbitration circuit 161 of the output port 62 that is the master port. The input port 51 then transmits the notification of communication permission from the arbitration circuit 161 to the arbitration circuit 112. In addition, the input port 51 receives the notification of communication permission from the arbitration circuit 164 of the output port 63. The input port 51 transmits the notification of communication permission from the arbitration circuit 164 to the arbitration circuit 112.

The input port 51 receives the data addressed to the CPU selected as the data transmission destination by the arbitration circuit 112 from the data transmission unit 113. The input port 51 transmits the received data to the output port to which the CPU of the data transmission destination is connected. For example, the input port 51 receives the data addressed to the CPU 2 from the data transmission unit 113. The input port 51 then transmits the data addressed to the CPU 2 to a data transfer unit 163 of the output port 62.

The output port 62 includes the arbitration circuit 161, an access counter 162, and the data transfer unit 163. Similarly, the output port 63 includes an arbitration circuit 164, an access counter 165, and a data transfer unit 166.

A case where the output port 62 is not in the idle state will be described. The arbitration circuit 161 receives the arbitration request with respect to the request to send data addressed to the CPU 2 from the input ports 51, 52, and 54. In a case where there are a plurality of arbitration requests, the arbitration circuit 161 selects one CPU from among CPUs that have transmitted the arbitration request, using a predetermined condition. For example, the arbitration circuit 161 stores therein the priority order of the CPUs 1, 3, and 4 in advance. The arbitration circuit 161 selects the CPU having the highest priority order in the stored priority order from among the CPUs that have transmitted the arbitration request. In addition to this, for example, the arbitration circuit 161 may select the CPU having the highest priority order while changing the priority order of the CPU by lowering the priority order of the CPU that has been once selected.

The arbitration circuit 161 transmits the notification of communication permission to the input port to which the selected CPU is connected. For example, when the CPU 1 is selected, the arbitration circuit 161 transmits the notification of communication permission to the input port 51.

The output port 62 receives information about the CPU that is paired with the master port from the master port control unit 70.

In a case where the output port 62 is in the idle state, the arbitration circuit 161 continues to transmit the notification of communication permission for the CPU paired with the master port designated by the master port control unit 70 to the input port to which the CPU is connected. For example, assuming that the CPU paired with the master port with respect to the output port 62 is the CPU 1, the arbitration circuit 161 continues to transmit the notification of communication permission to the input port 51 to which the CPU 1 is connected. At this time, upon receiving the arbitration request from the CPU 1 paired with the master port, the arbitration circuit 161 immediately instructs the data transfer unit 163 to transfer data from the CPU 1 paired with the master port to the CPU 2.

On the other hand, when the output port 62 receives the arbitration request from a CPU other than the CPUs paired with the master ports in the idle state, the output port 62 stops transmitting the notification of transmission permission to the master port. In a case where a plurality of arbitration requests are received, the arbitration circuit 161 performs arbitration and determines the CPU to be permitted to transmit data. Subsequently, the arbitration circuit 161 transmits the notification of transmission permission for the determined CPU to the input port to which the CPU is connected. In contrast, if only one arbitration request is received, the arbitration circuit 161 transmits the notification of transmission permission for the CPU that has transmitted the arbitration request to the input port to which the CPU is connected.

In a case where it is not in the idle state, when a plurality of arbitration requests are received, the arbitration circuit 161 performs arbitration and determines the CPU to be permitted data transmission. Subsequently, the arbitration circuit 161 transmits the notification of transmission permission for the determined CPU to the input port to which the CPU is connected. In contrast, if only one arbitration request is received, the arbitration circuit 161 transmits the notification of transmission permission for the CPU that has transmitted the arbitration request to the input port to which the CPU is connected.

For example, the arbitration circuit 161 receives information about the CPU 1 as a CPU paired with the master port from the master port control unit 70. At this time, upon receiving the arbitration request from the CPU 1, 3, and 4 in the idle state, the arbitration circuit 161 determines the CPU 1 paired with the master port as the CPU to be permitted data transmission. In this case, the CPUs 3 and 4 are not selected as the CPU to be permitted data transmission. In a case where the arbitration circuit 161 receives the arbitration request from the CPUs 1, 3, and 4 in a non-idle state, the arbitration circuit 161 performs arbitration and determines the CPU to be permitted data transmission.

Similarly, the arbitration is also performed in the other output ports, a CPU to be permitted data transmission is selected, and the notification of communication permission addressed to the CPU is transmitted to the input port to which the CPU is connected. For example, communication permission may be transmitted from different output ports to the same CPU. For example, the arbitration circuit 164 of the output port 63 receives the arbitration request from the CPU 1. The arbitration circuit 163 selects the CPU 1 as a CPU to be permitted data transmission. The arbitration circuit 164 then transmits the notification of communication permission for the CPU 1 to the input port 51. However, in a case where the output port 62 transmits the notification of communication permission to the CPU 1 in advance, although a notification of output permission from the arbitration circuit 164 is transmitted to the arbitration circuit 112 of the CPU 1, the CPU 3 is not selected as a data transmission destination.

When data transmission by the data transfer unit 163 to be described later is ended, the arbitration circuit 161 resumes the reception of the arbitration request. Then the arbitration circuit 161 performs arbitration again. In this manner, the arbitration circuit 161 repeatedly receives the arbitration request and performs arbitration.

The access counter 162 acquires, from the arbitration circuit 161, information about the CPU that is a source of the arbitration request received by the arbitration circuit. The access counter 162 totalizes the number of reception of the arbitration request for each source at regular intervals. The number of reception of the arbitration request is referred to as "access count" herein. After a certain period of time has elapsed, the access counter 162 transmits a totaled result of the access count together with information of the output port 62, which is an output port on which the access counter 162 is mounted, to the master port control unit 70.

In a case where the transmission unit 11 transmits data to the CPU 2, the data transfer unit 163 receives the data transmitted by the data transmission unit 113 of the transmission unit 11 from the input port 51. The data transfer unit 163 then transmits the received data to a reception unit 22 of the CPU 2.

The master port control unit 70 stores a threshold for setting the master port. The master port control unit 70 receives the totaled result of the access count in the output ports 61 to 64 at regular intervals from an access counter of each of the output ports.

The master port control unit 70 extracts the CPU of which access count is the largest for each port from the totaled result of the access count received from each of the output ports 61 to 64. The master port control unit 70 causes a combination of each of the output ports 61 to 64 and the extracted CPU to be a combination of the master port. That is, the master port control unit 70 causes the output port corresponding to the extracted CPU to be the master port for the CPU. At this time, in a case where the CPU of which access count is the largest is the same in a plurality of output ports, the master port control unit 70 does not set the master port if difference in the access count from the CPU is smaller than the threshold in those output ports. In contrast, in a case where the difference in the access count from the CPU is larger than the threshold in those output ports, the master port control unit 70 causes the output port of which access count is larger to be the master port for the CPU. The master port control unit 70 does not set the master port to an unselected output port.

The master port control unit 70 specifies top two CPUs of which access count to each port is high from the totaled result of the access count received from each of the output ports 61 to 64. In a case where there is a port in which difference in the access count from the top two CPUs is within the threshold and the port is set as a master port for any of the CPUs, the master port control unit 70 cancels the setting of the master port.

The master port control unit 70 specifies, for each CPU, the top two output ports of which access count is high among the output ports to which the arbitration request is transmitted from the CPU, from the totaled result of the access count received from each of the output ports 61 to 64. In a case where there is a CPU of which access count to the top two output ports is within the threshold and the master port is set for the CPU, the master port control unit 70 cancels the setting of the master port.

From the fact that the difference between the top two access counts is smaller than a certain value, it is considered that the access counts are equally matched. In this case, if the master port is set in advance, the master port may be given excessive priority. Therefore, in a case where the difference in access counts becomes smaller than a certain value, the master port control unit 70 dissolves unbalanced access by cancelling the setting of the master port.

For example, a case where the master port control unit 70 obtains the access count illustrated in FIG. 3 will be described. FIG. 3 is a diagram illustrating an example of the totaled result of the access count from each CPU to each output port.

In the case of FIG. 3, the CPU having the largest access count with respect to the output port 61 is the CPU 4. The CPU having the largest access count with respect to the output port 62 is the CPU 1. The CPU having the largest access count with respect to the output port 63 is the CPU 4. The CPU having the largest access count with respect to the output port

64 is the CPU 2. The CPU 4 has the largest access count in the output ports 61 and 63. Assuming that the master port control unit 70 stores a threshold of 10, the master port control unit 70 causes a pair of the output port 63 of which access count is larger and the CPU 4 to be a master port pair. The CPU 1 has an access count of 30 with respect to the output port 62 and has an access count of 20 with respect to the output port 63. In this case, since the difference in the access counts of the CPU 1 with respect to the top two output ports is within 10, the master port control unit 70 does not set the master port pair by combining with the CPU 1. In a case where the CPU 1 is already a master port pair, the master port control unit 70 cancels the setting of the master port. Therefore, in a case of FIG. 3, the master port control unit 70 causes the output port 63 and the CPU 4 to be a master port pair, and causes the output port 64 and the CPU 2 to be a master port pair.

In the present embodiment, a combination of the CPU of which access count at a time is the largest and the output port is set as a master port pair. Subsequently, the setting of the master port is cancelled by the access count from the same CPU and the access count to the same output port. However, the embodiment is not limited thereto. An output port and a CPU of which master port is not set by the access count from the same CPU and the access count to the same output port may be determined before setting the master port, and the master port may be set thereafter.

In a case where the transmission unit 11 transmits data to the CPU 2, the reception unit 22 receives the data transmitted by the transmission unit 11 from the data transfer unit 163. The CPU 2 performs processing using the data received by the reception unit 22.

Figure 4:
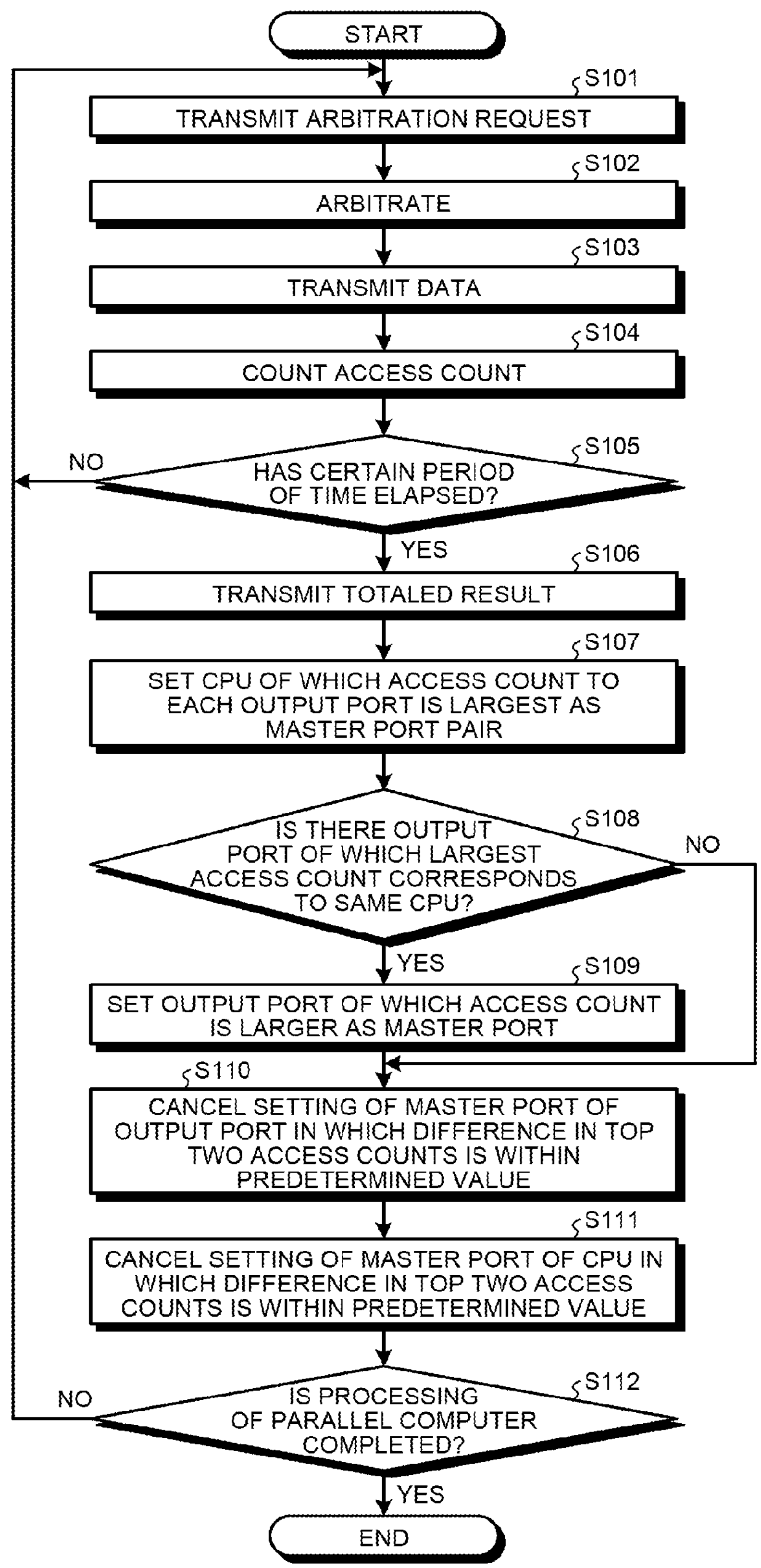
FIG. 4 is a flowchart of switching process of a master port in the parallel computer according to the first embodiment.

Next, a flow of switching process of the master port in the parallel computer according to the present embodiment will be described with reference to FIG. 4. FIG. 4 is a flowchart of the switching process of the master port in the parallel computer according to the first embodiment.

The respective request transmission units 111, 121, and 141 of the CPUs 1 to 4 transmit the arbitration requests to the output ports 62 to 64 to which the CPUs of the data transmission destination are connected via the input ports 51 to 54 of the crossbar switch 5 to which the request transmission units 111 to 141 are connected (step S101).

The arbitration circuits of the output ports 61 to 64 perform arbitration with respect to the CPUs 1 to 4 that have transmitted the arbitration requests (step S102), and select the CPU to be permitted transmit data. At this time, the output port to which the master port is set among the output ports 61 to 64 preferentially selects the CPU paired with the master port as the data transmission destination. The output ports 61 to 64 then transmit the notification of communication permission to the selected CPU.

In a case where a plurality of notifications of communication permission are received, the CPUs 1 to 4 select the CPU to which the output ports 61 to 64 that have first transmitted the notification of communication permission are connected as a data transmission destination. In a case where the notification of communication permission is received from one port, the CPUs 1 to 4 select the port as the data transmission destination. The CPUs 1 to 4 then transmit data to the output ports 61 to 64 to which the CPUs of the data transmission destination are connected via the input ports 51 to 54 to which the CPUs 1 to 4 are connected (step S103). The reception units 12, 22, 32, 42 receive the data transmitted from the corresponding output ports 61 to 64.

Each of the access counters of the output ports 61 to 64 counts the number of received arbitration requests and counts the access count for each CPU (step S104).

Each of the access counters of the output ports 61 to 64 determines whether a certain period of time has elapsed (step S105). When the time has not elapsed (No at step S105), the access counter is kept waiting, and the CPUs 1 to 4 and the crossbar switch 5 return to step S101.

In contrast, when a certain period of time has elapsed (Yes at step S105), each of the access counters of the output ports 61 to 64 transmits the totaled result of the access count to the master port control unit 70 (step S106).

The master port control unit 70 receives the totaled result of the access count from each of the access counters of the output ports 61 to 64. The master port control unit 70 then sets the CPUs 1 to 4 of which access count to each of the output ports 61 to 64 is the largest and the corresponding port as a master port pair (step S107).

Next, the master port control unit 70 determines whether there are the output ports 61 to 64 in which the CPUs 1 to 4 having the largest access count are the same (step S108). When there is no output ports 61 to 64 in which the CPUs 1 to 4 having the largest access count are the same (No at step S108), the master port control unit 70 proceeds to step S110.

In contrast, in a case where there are the output ports 61 to 64 in which the CPUs 1 to 4 having the largest access count are the same (Yes at step S108), the master port control unit 70 sets the output port of which access count is larger as the master port for the CPU (step S109).

Next, in a case where there is an output port in which the difference in the top two access counts is within the predetermined value among the output ports 61 to 64, the master port control unit 70 cancels the setting of the master port of the output port (step S110).

In addition, in a case where there is a CPU in which the difference in the top two access counts is within the predetermined value among the CPUs 1 to 4, the master port control unit 70 cancels the setting of a pair of the CPU and the master port (step S111).

The CPUs 1 to 4 determine whether the processing of the parallel computer is completed (step S112). When the processing is not completed (No at step S112), the CPUs 1 to 4 and the crossbar switch 5 return to step S101.

On the other hand, when the processing of the parallel computer is completed (Yes at step S112), the CPUs 1 to 4 and the crossbar switch 5 end the processing.

Next, data transmission process by a conventional parallel computer will be described with reference to FIG. 5. FIG. 5 is a timing chart of the data transmission process in a case where negation is performed by the conventional parallel computer. Graphs 201 to 203 illustrate transmission of the arbitration request from the transmission unit 11 to each of the output ports. A graph 204 illustrates data transmission from the transmission unit 11. Graphs 205 to 207 illustrate transmission of the arbitration request from the transmission unit 31 to each of the output ports. A graph 208 illustrates data transmission from the transmission unit 31. Graphs 209 to 212 illustrate destination of the notification of transmission permission by the output ports 61 to 64 and data transfer.

As represented by the graphs 201 to 203, the transmission unit 11 transmits the arbitration request to the output ports 62 to 64 at timings 221 to 223. The output port 62 is the master port of the transmission unit 11. Therefore, as illustrated in the graphs 204 and 209, the transmission unit 11 immediately selects the output port 62 as the data transmission destination and starts data transmission. At this time, the output ports 63 and 64 receive the arbitration request from the transmission unit 11 to perform arbitration at timings 224 and 225 in the graphs 210 and 211. The output ports 63 and 64 transmit the notification of communication permission to the transmission unit 11. However, since the transmission unit 11 selects the output port 62 as the data transmission destination, the output ports 63 and 64 are not selected as the data transmission destination. Therefore, the output ports 63 and 64 negate the notification of transmission permission. The output port 63 sets the transmission unit 21 as the master port at timing 226 in the graph 210. The output port 64 sets the transmission unit 31 as the master port at timing 227 in the graph 211.

In addition, as illustrated in the graphs 205 to 207, the transmission unit 31 transmits the arbitration request to the output ports 61, 62, and 64 at timings 228 to 230. At this time, since the output port 62 is transferring the data, the transmission unit 31 is not permitted to transmit data in the output port 62. On the other hand, the output port 64 is the master port of the transmission unit 31. Therefore, as illustrated in graphs 208 and 211, the transmission unit 31 immediately selects the output port 64 as the data transmission destination and starts data transmission. In contrast, the output port 61 receives the arbitration request from the transmission unit 31, performs arbitration at timing 231 in the graph 212, and permits data transmission of the transmission unit 31. However, since the transmission unit 31 selects the output port 64 as the data transmission destination, the output port 61 is not selected as the data transmission destination. Therefore, the output port 61 negates the notification of transmission permission. The output port 61 then sets the transmission unit 41 as the master port at timing 232 in the graph 212.

In addition, as illustrated in the graphs 201 to 203, the transmission unit 11 transmits the arbitration request again to the output ports 62 to 64 at timings 233 to 235. The output port 62 is the master port of the transmission unit 11. Therefore, as illustrated in the graphs 204 and 209, the transmission unit 11 immediately selects the output port 62 as the data transmission destination and starts data transmission. At this time, since the output port 64 is transferring the data, the transmission unit 11 is not permitted to transmit data in the output port 64. In contrast, the output port 63 receives the arbitration request from the transmission unit 11, performs arbitration at timing 236 in the graph 210, and permits data transmission of the transmission unit 31. However, since the transmission unit 11 selects the output port 62 as the data transmission destination, the output port 63 is not selected as the data transmission destination. Therefore, the output port 63 negates the notification of transmission permission. The output port 63 then sets the transmission unit 21 as the master port at timing 237 in the graph 210. Due to such process, as illustrated in the graph 209, a pair of the transmission unit 11 and the output port 62, which is a master port pair, is continuously selected and performs data transfer. Therefore, as illustrated in the graph 201, there is a risk that the output port 63 does not perform data transfer for a long period of time.

As described above, in the related art, an output port that does not perform data transfer for a long period of time is generated since the CPU paired with the master port is preferentially selected as illustrated in FIG. 5. In contrast, in the parallel computer according to the present embodiment, a master port pair may be prevented from being continuously selected, and the generation of the output port that does not perform data transfer for a long period of time may be suppressed.

As described above, in the parallel computer according to the present embodiment, a combination of the CPU of which access count is the largest and the output port is set as a master port pair, and the master port pair is dynamically changed. Accordingly, it can be prevented that a specific combination of a CPU and an output port is given excessive priority as in the case where it is fixed as the master port, so that efficient communication may be performed. In addition, since a combination of the CPU of which access count is the largest and the output port is set as the master port at that time, a specific port may be given priority corresponding to the process, and more efficient communication may be performed.

In addition, the setting of the master port is canceled when approaching higher access count. Therefore, when probability of a specific combination is not high, an output port being given priority is not necessarily set and the data may be transmitted impartially to all of the output ports. Due to this, it can be said that the efficient communication may be performed.

[b] Second Embodiment

Next, the parallel computer system according to a second embodiment will be described. The parallel computer system according to the present embodiment is different in a method for selecting the master port from the first embodiment. The parallel computer according to the present embodiment is also illustrated in the block diagram of FIG. 1 and FIG. 2. Components having similar functions as those in the first embodiment are not repeatedly described below.

The master port control unit 70 stores a selection threshold for selecting a candidate for the master port in advance. The master port control unit 70 receives a totaled result from the access counters of the output ports 61 to 64 at regular intervals.

The master port control unit 70 extracts a CPU of which access count is equal to or more than the selection threshold for each of the output ports 61 to 64 from the received totaled result.

The master port control unit 70 performs arbitration with respect to the extracted CPU for each of the output ports 61 to 64 and selects the CPU paired with the master port for each of the output ports 61 to 64. This method for arbitration is not particularly limited so long as it is an algorithm that can select one CPU from among a plurality of CPUs. For example, the master port control unit 70 may store priority of each CPU for each output port in advance, and may select the CPU of which priority is the highest among the extracted CPUs. The master port control unit 70 may exclude the previously selected CPU and select the CPU of which priority is the highest among the other CPUs.

In addition, in a case where the same CPU is selected by a plurality of output ports as a CPU to be paired with the master port, the master port control unit 70 may determine a master port pair therein and perform arbitration for selecting the master port again among remaining output ports. For example, among a plurality of output ports that are master ports for the same CPU, the output port of which access count from the CPU is the largest may be determined as a master port for the CPU.

The master port control unit 70 then transmits information about the determined CPU that is paired with the master port to each of the output ports 61 to 64.

Figure 6:
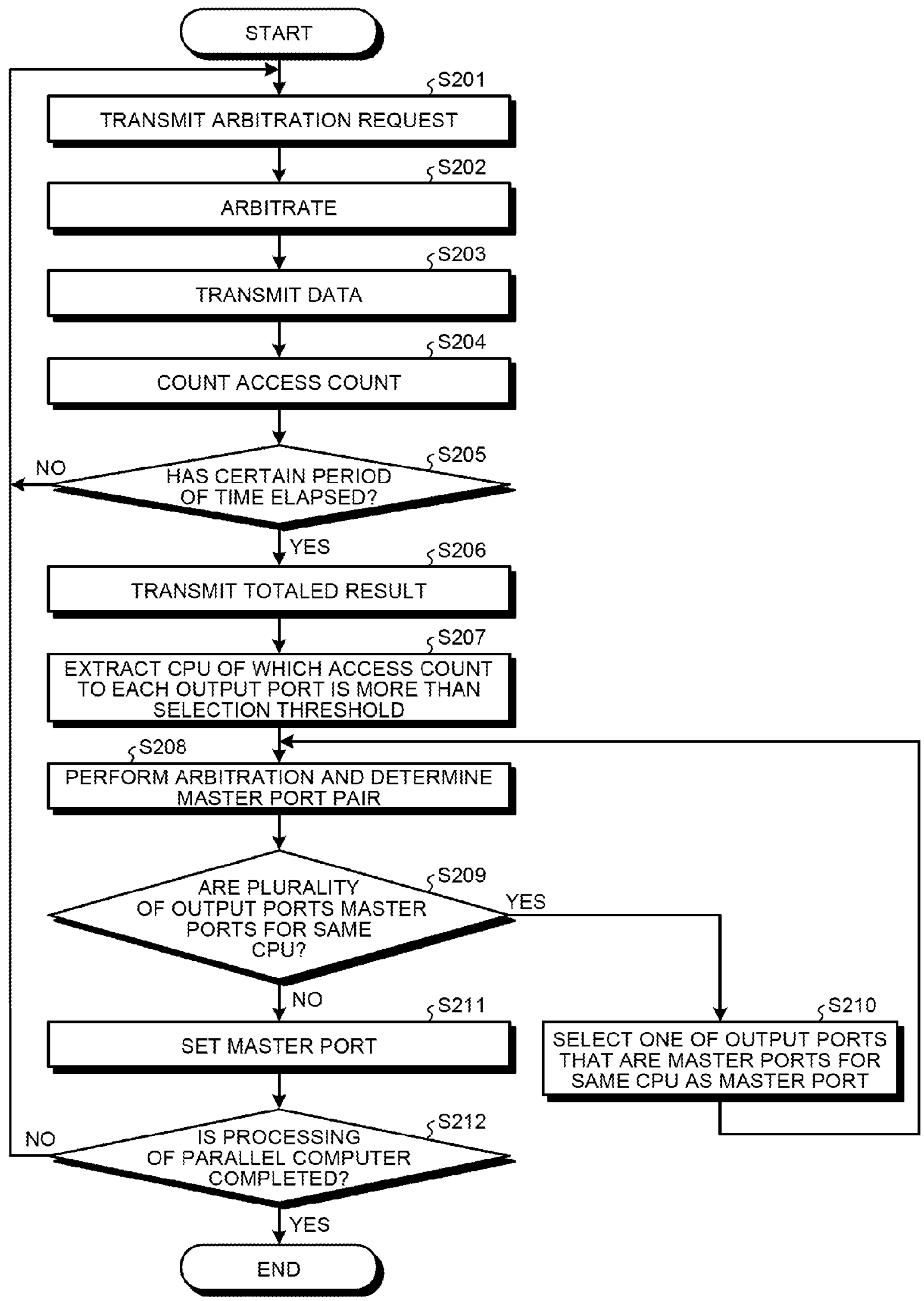
FIG. 6 is a flowchart of a switching process of a master port in a parallel computer according to a second embodiment.

Next, a flow of the switching process of the master port in the parallel computer according to the present embodiment will be described with reference to FIG. 6. FIG. 6 is a flowchart of the switching process of the master port in the parallel computer according to the second embodiment.

Respective request transmission units 111 to 141 of the CPUs 1 to 4 transmit the arbitration request to the output ports 62 to 64 to which the CPUs of the data transmission destination are connected via the input ports 51 to 54 of the crossbar switch 5 to which the request transmission units 111 to 141 are connected (step S201).

The arbitration circuits of the output ports 61 to 64 perform arbitration with respect to the CPUs 1 to 4 that have transmitted the arbitration request (step S202), and select the CPU to be permitted to transmit data. At this time, an output port of which master port is set among the output ports 61 to 64 preferentially selects the CPU paired with the master port as the data transmission destination. The output ports 61 to 64 then transmit the notification of communication permission to the selected CPU.

In a case where a plurality of notifications of communication permission are received, the CPUs 1 to 4 select the CPU to which the output ports 61 to 64 that have first transmitted the notification of communication permission are connected as the data transmission destination. In a case where the notification of communication permission is received from one port, the CPUs 1 to 4 select the port as the data transmission destination. The CPUs 1 to 4 then transmit data to the output ports 61 to 64 to which the CPU of the data transmission destination is connected via the input ports 51 to 54 to which the CPUs 1 to 4 are connected (step S203). The reception units 12 to 42 receive data transmitted from the corresponding output ports 61 to 64.

Each of the access counters of the output ports 61 to 64 counts the number of the received arbitration requests and counts the access count for each CPU (step S204).

Each of the access counters of the output ports 61 to 64 determines whether a certain period of time has elapsed (step S205). When the time has not elapsed (No at step S205), the access counter is kept waiting, and the CPUs 1 to 4 and the crossbar switch 5 return to step S201.

In contrast, when a certain period of time has elapsed (Yes at step S205), each of the access counters of the output ports 61 to 64 transmits the totaled result of the access count to the master port control unit 70 (step S206).

The master port control unit 70 receives the totaled result of the access count from each of the access counters of the output ports 61 to 64. The master port control unit 70 then extracts the CPUs 1 to 4 of which access count with respect to the output ports 61 to 64 is more than the selection threshold (step S207).

Next, the master port control unit 70 performs arbitration with respect to the extracted CPUs 1 to 4 for each of the output ports 61 to 64 to determine a master port pair (step S208).

The master port control unit 70 determines whether a plurality of output ports among the output ports 61 to 64 are master ports for the same CPU (step S209). In a case where a plurality of output ports are the master ports for the same CPU (Yes at step S209), the master port control unit 70 performs arbitration for a plurality of output ports that are the master ports for the same CPU, and selects one output port as the master port for the CPU (step S210). Subsequently, the master port control unit 70 returns to step S208, performs arbitration for an unselected output port, and determines a master port pair.

In a case where a plurality of output ports are not the master ports for the same CPU (No at step S209), the master port control unit 70 notifies each of the output ports 61 to 64 of information about the CPU paired with the determined master port, and sets the master port (step S211).

The CPUs 1 to 4 determine whether the processing in the parallel computer is completed (step S212). When the processing is not completed (No at step S212), the CPUs 1 to 4 and the crossbar switch 5 return to step S201.

On the other hand, when the processing in the parallel computer is completed (Yes at step S212), the CPUs 1 to 4 and the crossbar switch 5 end the processing.

As described above, the parallel computer system according to the present embodiment determines the CPU that is paired with the master port by the arbitration among the CPUs of which access count is equal to or more than the threshold. By selecting the CPU that is paired with the master port through the arbitration, the master port may be set in a more balanced manner as compared with a case where the CPU of which access count is the largest is automatically set to the master port. Therefore, it can be prevented that a specific combination of a CPU and an output port is given excessive priority as in the case where it is fixed as the master port, so that efficient communication may be performed. In addition, a specific port may be given priority corresponding to the process, and more efficient communication may be performed.

Third Embodiment

Figure 7:
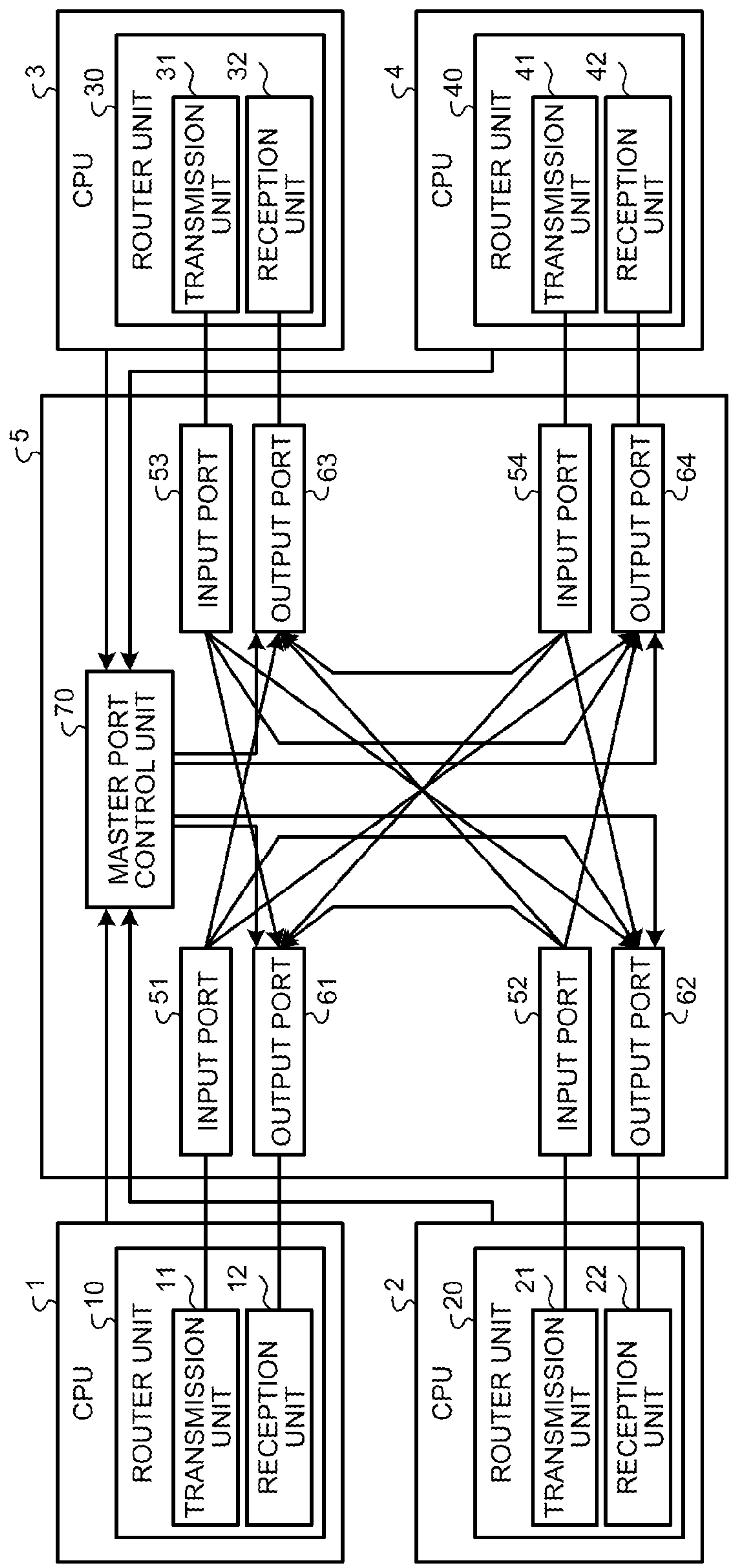
FIG. 7 is a configuration diagram of a parallel computer according to a third embodiment.

Next, a parallel computer system according to a third embodiment will be described. The parallel computer system according to the present embodiment is different in a method for selecting the master port from the first and the second embodiments. FIG. 7 is a configuration diagram of the parallel computer according to the third embodiment. Components having similar functions as those in the first embodiment are not repeatedly described below.

Each of the CPUs 1 to 4 transmits information about a CPU to which data is frequently transmitted from itself in software to be executed to the master port control unit 70. For example, the CPUs 1 to 4 obtain frequency of data transfer among the CPUs based on data transfer amount among the CPUs stored in the software, and notify the master port of a CPU to be paired therewith of which frequency of data transmission is high.

The master port control unit 70 stores therein, in advance, a pattern of the master port that is a pattern of a combination in which the CPU and the output port are set as a master port pair. The master port control unit 70 receives information about the CPU of which frequency of data transmission is high from each of the CPUs 1 to 4.

The master port control unit 70 selects, in each of the CPUs 1 to 4, a pattern of the master port in which the output ports 61 to 64 connected to the CPU of which frequency of data transmission is high are set as the master ports for the CPUs 1 to 4. The master port control unit 70 then notifies each of the output ports 61 to 64 of information about each CPU that is paired with the master port according to the selected pattern of the master port.

Figure 8:
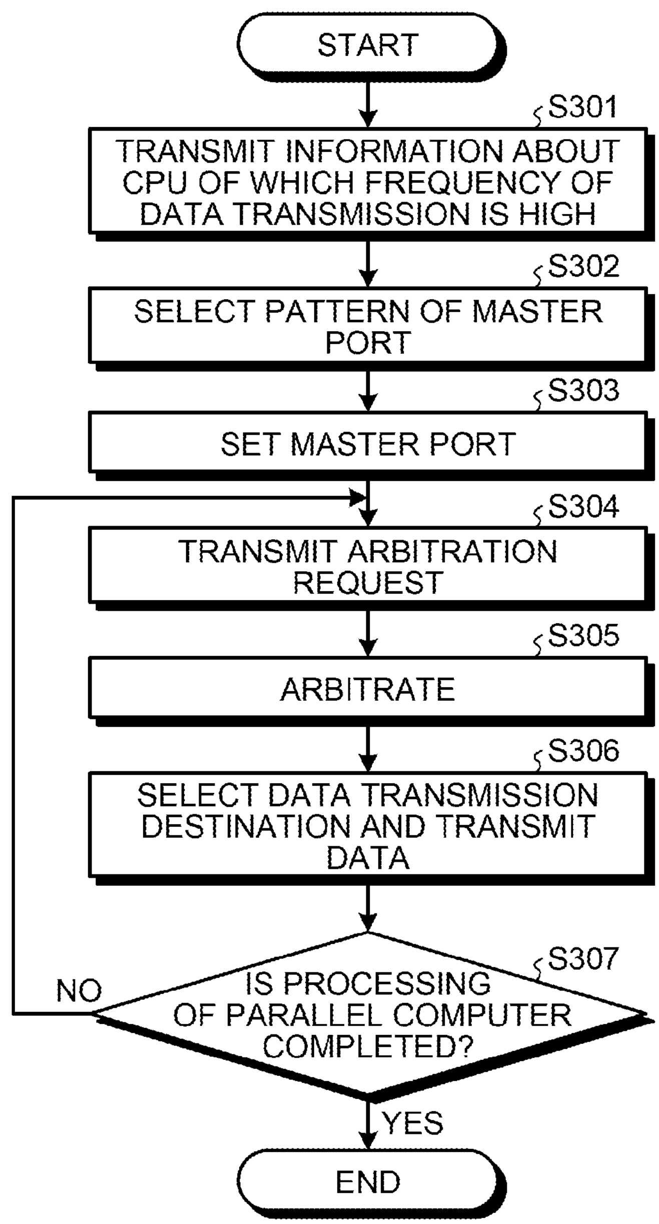
FIG. 8 is a flowchart of switching process of a master port in the parallel computer according to the third embodiment.
Figure 9:
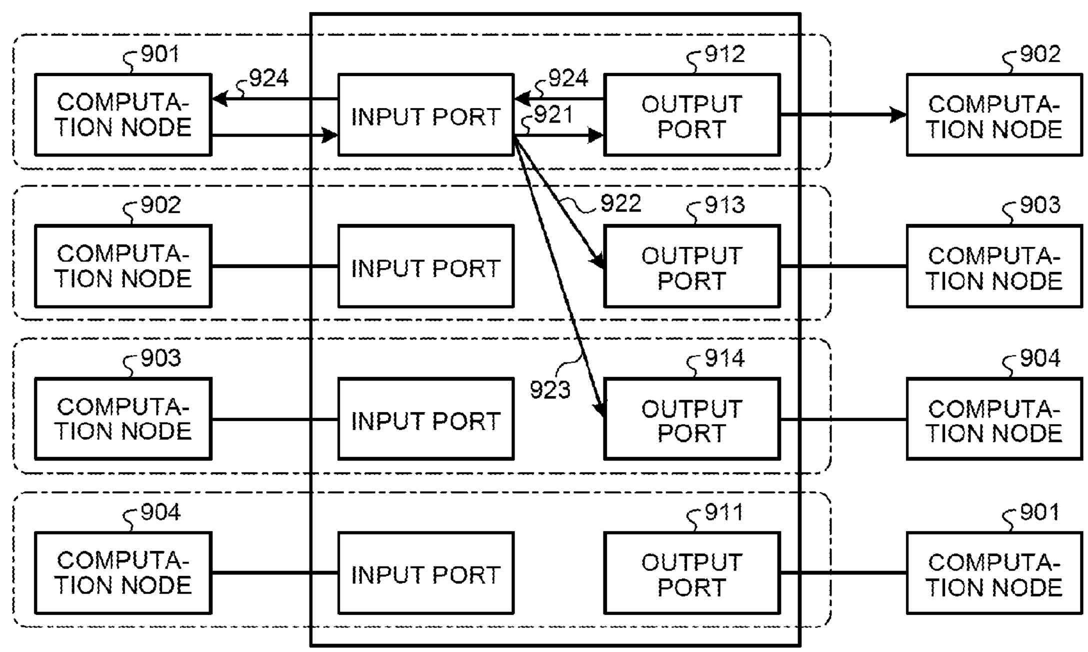
FIG. 9 is a diagram for explaining data transfer in a parallel computer in a case where a combination of which communication probability is high is grouped.

Next, a flow of the switching process of the master port in the parallel computer according to the present embodiment will be described with reference to FIG. 8. FIG. 8 is a flowchart of the switching process of the master port in the parallel computer according to the third embodiment.

Each of the CPUs 1 to 4 transmits information about a CPU of which frequency of data transmission from itself is high in software to be executed to the master port control unit 70 (step S301).

The master port control unit 70 receives information about the CPU of which frequency of data transmission is high from each of the CPUs 1 to 4. The master port control unit 70 selects a pattern of the master port in which the output ports 61 to 64 connected to the CPU of which frequency of data transmission is high are set as the master ports for the CPUs 1 to 4 (step S302).

The master port control unit 70 then notifies each of the output ports 61 to 64 of information about each CPU that is paired with the master port according to the selected pattern of the master port, and sets the master port (step S303).

Respective request transmission units 111 to 141 of the CPUs 1 to 4 transmit the arbitration request to the output ports 62 to 64 to which the CPUs of the data transmission destination are connected via the input ports 51 to 54 of the crossbar switch 5 to which the request transmission units 111 to 141 are connected (step S304).

The arbitration circuits of the output ports 61 to 64 perform arbitration with respect to the CPUs 1 to 4 that have transmitted the arbitration request (step S305), and select the CPU to be permitted to transmit data. At this time, an output port of which master port is set among the output ports 61 to 64 preferentially selects the CPU paired with the master port as the data transmission destination. The output ports 61 to 64 then transmit the notification of communication permission to the selected CPU.

In a case where a plurality of notifications of communication permission are received, the CPUs 1 to 4 select the CPU to which the output ports 61 to 64 that has first transmitted the notification of communication permission are connected as the data transmission destination. In a case where the notification of communication permission is received from one port, the CPUs 1 to 4 select the port as the data transmission destination. The CPUs 1 to 4 then transmit data to the output ports 61 to 64 to which the CPU of the data transmission destination is connected via the input ports 51 to 54 to which the CPUs 1 to 4 are connected (step S306). The reception units 12 to 42 receive data transmitted from the corresponding output ports 61 to 64.

The CPUs 1 to 4 determine whether the processing in the parallel computer is completed (step S307). When the processing is not completed (No at step S307), the CPUs 1 to 4 and the crossbar switch 5 return to step S304.

On the other hand, when the processing in the parallel computer is completed (Yes at step S307), the CPUs 1 to 4 and the crossbar switch 5 end the processing.

As described above, in the parallel computer system according to the present embodiment, an output port connected to a CPU of which frequency of data transfer from each CPU is high in software is set as a master port of each CPU. Accordingly, the master port may be set corresponding to a certain trend of data transfer depending on the software, and more efficient communication may be performed. It can be prevented that a specific master port is given excessive priority as in the case where the master port is fixedly set, so that more efficient data transfer may be performed.

According to an aspect of a parallel computer system, a data transfer device, and a method for controlling the parallel computer system disclosed in the present application, an effect that efficient communication may be performed is produced.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A parallel computer system comprising:

a plurality of computation nodes each of which performs computation; and a data transfer device connected to the computation nodes, wherein the data transfer device comprises:

a plurality of ports that include: an arbitration unit that selects a computation node to be paired when receiving an arbitration request from the computation node to be paired in a predetermined state in which a data transfer is not previously performed or an arbitration request is not previously received, receives the arbitration request from any one or more of the computation nodes in a state other than the predetermined state, selects one of the computation nodes from which the arbitration request has been received, and returns transmission permission to the selected computation node; and a data transfer unit that receives data from the computation node selected by the arbitration unit and transfers the received data to another computation node; and a combination determining unit that dynamically determines the computation node to be paired with each of the ports among the computation nodes, wherein each of the computation nodes comprises:

a request transmission unit that transmits an arbitration request that is a request to send data, to the port; and a data transmission unit that transmits data to the paired port when the request transmission unit transmits an arbitration request to the paired port in the predetermined state, and transmits data to a port that has returned transmission permission to the arbitration request in the other cases.

2. The parallel computer system according to claim 1, wherein the combination determining unit sets a computation node of which data communication access count in a first predetermined time is the largest with respect to each of the ports as a computation node paired with the corresponding port.

3. The parallel computer system according to claim 1, wherein the combination determining unit counts the data communication access count from each of the computation nodes in the port, and selects one computation node to be paired from computation nodes of which data communication access count is more than a threshold.

4. The parallel computer system according to claim 1, wherein the combination determining unit determines a combination of the computation node and the port based on processing executed by the computation node.

5. The parallel computer system according to claim 2, wherein, when there is a port in which difference between top two data communication access counts in a second predetermined time is equal to or less than a predetermined value, the combination determining unit releases a computation node paired with the port.

6. The parallel computer system according to claim 5, wherein, when the difference between top two data communication access counts in the second predetermined time is equal to or more than a threshold in the port from which the paired computation node is released, the combination determining unit sets a computation node of which data communication access count in the first predetermined time is the largest with respect to the port as a computation node to be paired.

7. The parallel computer system according to claim 4, wherein the combination determining unit determines a combination of the computation node and the port according to communication traffic between each of the computation nodes and each of the ports in processing executed by the computation node.

8. A data transfer device comprising:

a plurality of ports connected to a plurality of computation nodes each of which performs computation;

a combination determining unit that determines a port to be paired with each of the computation nodes among the ports;

an arbitration unit that selects a computation node to be paired when receiving an arbitration request from the computation node to be paired in a predetermined state which is a case where a data transfer is not previously performed or a case where an arbitration request is not previously received, receives the arbitration request that is a request to send data, from any one or more of the computation nodes in a state other than the predetermined state, selects one of the computation nodes from which the arbitration request has been received, and returns transmission permission to the selected computation node; and a data transfer unit that receives data from the computation node selected by the arbitration unit and transfers the received data to another computation node.

9. A method for controlling a parallel computer system comprising a plurality of computation nodes each of which performs computation and a data transfer device including a plurality of ports connected to the computation nodes, the method comprising:

determining the computation node to be paired with each of the ports among the computation nodes;

causing the computation node to transmit an arbitration request that is a request to send data, to the port;

causing the port to receive the arbitration request from the computation node;

causing the port to select the paired computation node when the port receives the arbitration request from the paired computation node in a predetermined state which is a case where a data transfer is not previously performed or a case where an arbitration request is not previously received, causing the port to select one of the computation nodes from which the arbitration request has been received in a state other than the predetermined state to return transmission permission to the selected computation node;

causing the computation node to transmit data to the paired port when the computation node transmits the arbitration request to the paired port in the predetermined state;

causing the computation node to transmit data to the port that has returned the transmission permission in response to the arbitration request when the arbitration request is not transmitted to the paired port in the predetermined state; and causing the port to receive data from the selected computation node and to transfer the received data to another computation node.

* * * * *